United States Patent

Burt

[15] 3,642,117
[45] Feb. 15, 1972

[54] ARTICLE POSITIONING APPARATUS FOR ROLLER CONVEYORS

[72] Inventor: Harold S. Burt, Wilmette, Ill.
[73] Assignee: Conveyor Systems, Inc., Morton Grove, Ill.
[22] Filed: Jan. 15, 1970
[21] Appl. No.: 3,043

[52] U.S. Cl. ..................................................198/38, 198/29
[51] Int. Cl. ..........................................................B65g 43/00
[58] Field of Search ..........................198/29, 38, 31 AB, 127; 226/20; 271/52, 49

[56] References Cited

UNITED STATES PATENTS

| | | | |
|---|---|---|---|
| 2,786,675 | 3/1957 | Montefalco et al. | 226/20 |
| 3,029,923 | 4/1962 | Bilocq | 198/29 |

*Primary Examiner*—Richard E. Aegerter
*Attorney*—Wallenstein, Spangenberg, Hattis & Strampel

[57] ABSTRACT

An article positioning apparatus is provided for a roller conveyor system to enable one selected side surface of each of a plurality of articles moving longitudinally in spaced relation along a conveyor to be located precisely, and with repeatable accuracy, adjacent a code reader sensitive to indicia positioned on said side surface of each of the articles. The article positioning apparatus in its preferred form includes a plurality of driven rollers which are adapted to be moved in unison while an article is still moving longitudinally therealong in a direction transverse to the conveyor, thereby to shift said one selected side surface of the article into abutting relation to article guide means positioned parallel to the path of travel of the article. The code reader, in response to the indicia on the side surface of the article, activates an article ejection mechanism which quickly moves the article off the conveyor at a selected discharge station.

8 Claims, 5 Drawing Figures

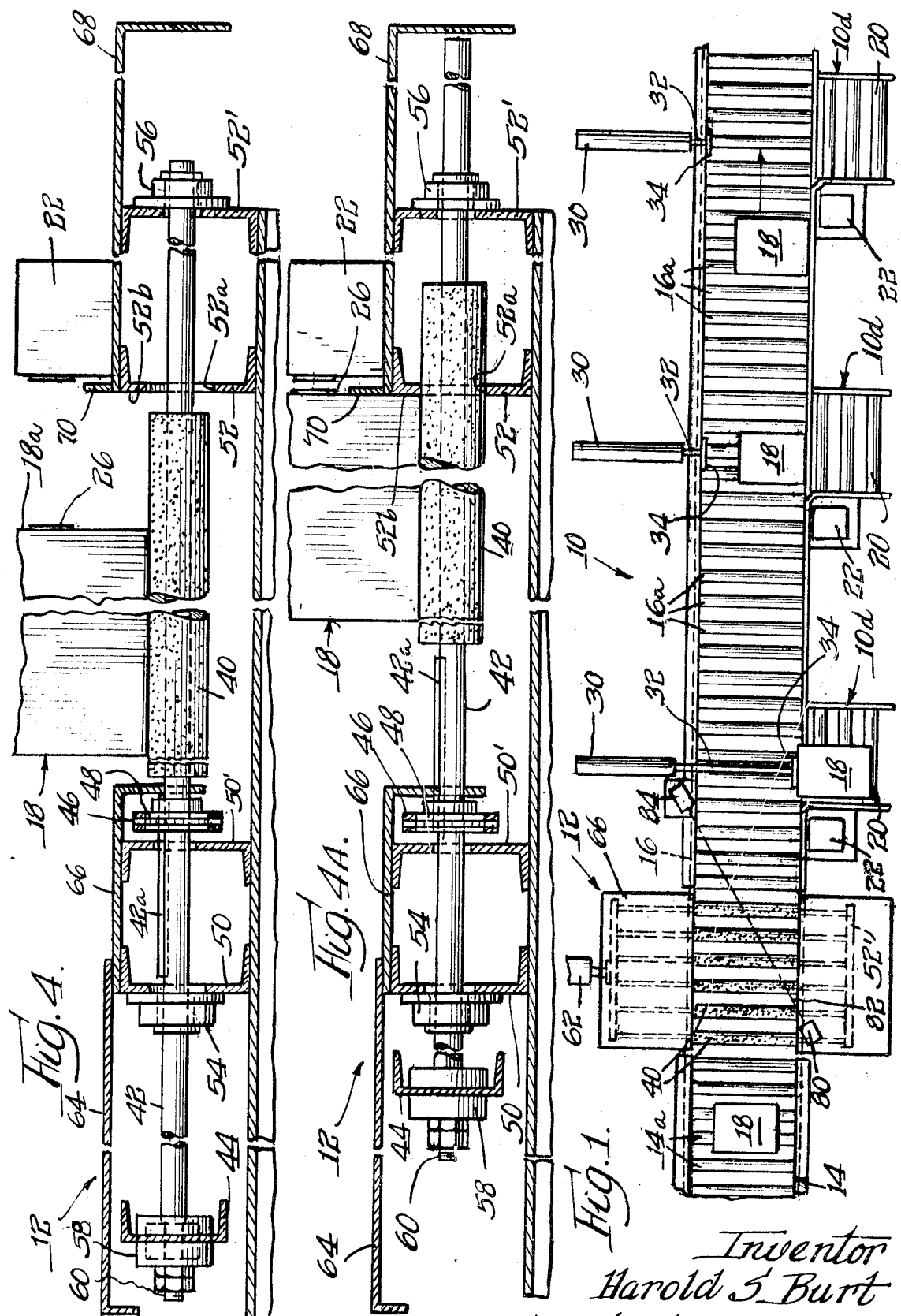

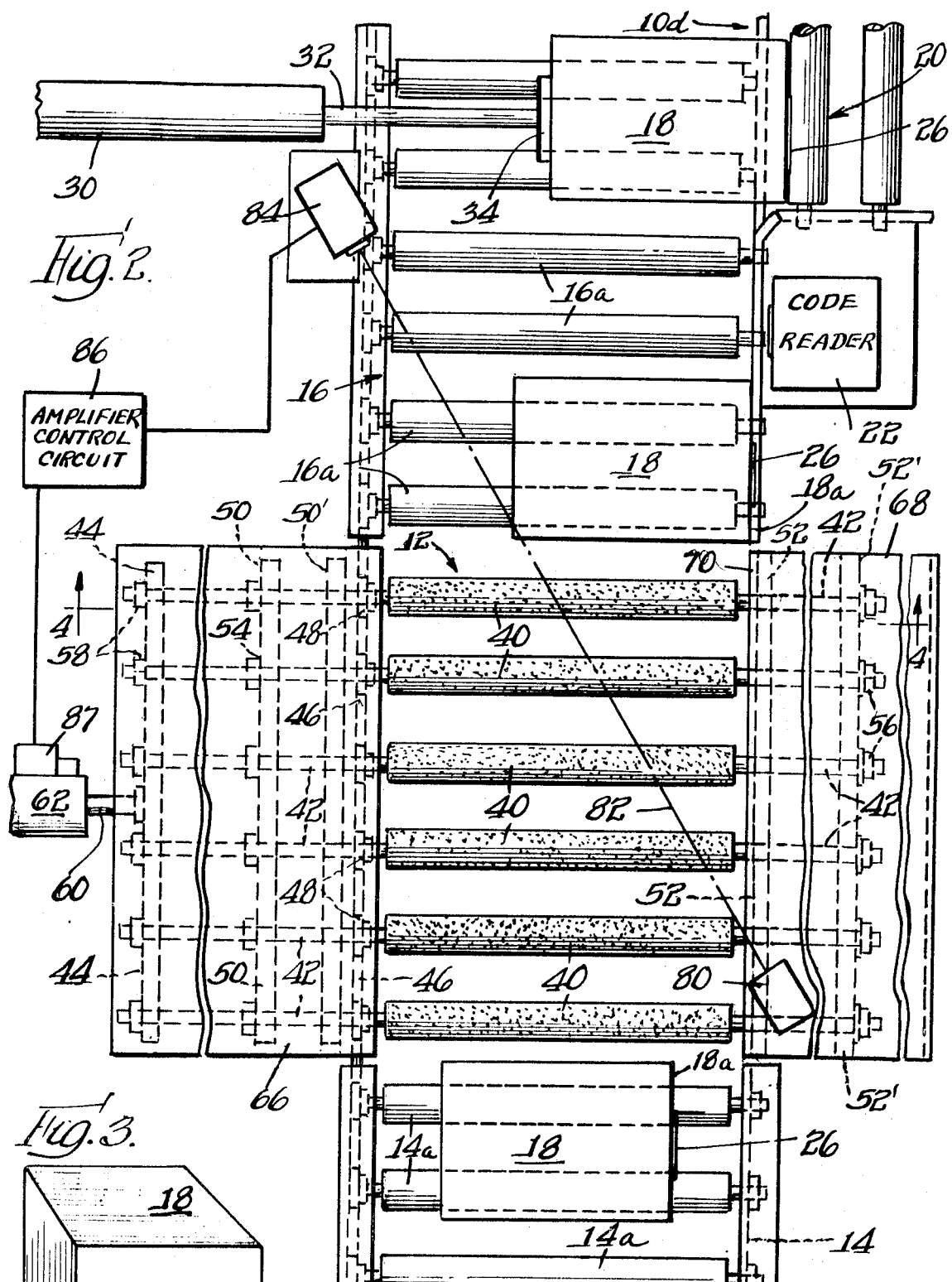

ARTICLE POSITIONING APPARATUS FOR ROLLER CONVEYORS

The present invention relates generally to conveyor systems which selectively discharge articles at preselected one of a number of possible discharge stations, and, in particular, to article positioning apparatus for use in conjunction with such systems to enable selective discharge to be achieved accurately and economically.

Conveyor systems, wherein articles such as boxes or cartons moving therealong are selectively discharged at one of a selection of stations, are in widespread use. Generally speaking, in the high-speed operation of such conveyor systems, selective ejection or discharge of articles moving along a given path thereof is accomplished by automatic means including a sensing device or code reader positioned in front of each discharge station which is actuatable by coded indicia carried on a side surface of the article which indicia indicates that the article is to be discharged at the station involved. Conveyor systems are generally purchased to accommodate articles of a variety of sizes and so are of a width to handle the widest expected articles. The code readers are generally placed along one side of the conveyor adjacent each discharge station, and, to be operative, the indicia on the articles should be facing the code reader and be a certain minimum distance therefrom. Where the articles are fed onto the conveyor system in random or variable positions, difficulties are sometimes encountered in assuring a sufficiently close spacing of the indicia containing sides of the articles from the side of the conveyor systems containing the coded readers to operate the same.

The coded indicia are generally placed on narrow labels attached to the sides of rectangular boxes or cartons. To minimize criticality of the spacing of the indicia from the code readers and the need for an almost parallel relationship between the plane of the labels and the side of the conveyor system involved, the indicia is desirably a light-reflecting material. These labels due, in the main, to the cost of the special coating materials used to form the light-reflecting indicia thereon, are relatively expensive, presently of the order of 1½ cents, or more, each. In a large volume, high-speed operation, the cost of the labels, therefore, can represent a significant operating expense item. Labels having coded indicia printed with ordinary ink costs less than one half that of the labels with light-reflecting ink. However, such inexpensive labels require a very close spacing of the labels from the code readers and a parallel relationship between the labels and the code readers.

The use of the low-cost labels requires, in most cases, means for positioning the side of the article containing the coded indicia in close proximity to the side of the conveyor where the code readers are located. One means heretofore employed for this purpose are stationary slanted guide rails against which a moving article is moved by the conveyor to shaft the same transversely to one side of the conveyor where it abuts a longitudinal box straightening wall. One disadvantage in utilizing such guide rails is that they can only be used where the conveyor is used with articles of the same width. Also, the guide rails, particularly where an elongated article is conveyed with the longest dimension extending across the conveyor, sometimes causes such twisting of the article that the side thereof containing the coded labels may end up facing longitudinally rather than laterally toward the side of the conveyor.

Still another means heretofore used to position moving articles on a conveyor is the provision of permanently tilted rollers in the conveyor line. Such rollers impart a transverse component of movement to an article which causes it to move against a side rail, thus limiting or fixing the position of one side of the article. This arrangement, however, sometimes causes excessive twisting of the articles as described above in connection with use of slanted guide rails where the coded labels face longitudinally rather than laterally necessary for a code reading operation.

Yet another means heretofore used for positioning articles along a conveyor involves the use of a movable spring mounted plunger which is actuated to move transversely of the direction of the conveyor to engage the side of the articles transported thereon and push them against a limiting side rail. However, the resulting sandwiching of an article between the side rail and the plunger often stops forward movement of the article involved until the plunger retracts from its fully extended position, the dwell time of the plunger in its article-holding position being a function of the dimension of the article extending transversely of the conveyor. The stoppage of an article can cause a jam-up of the articles being transported on the conveyor. In order to lessen the possibility of this occurrence, the articles must be spaced apart a greater distance on the conveyor resulting in wasted space and time in the handling of the articles.

In accordance with the present invention, article positioning apparatus for conveyor systems is provided which overcomes the aforementioned shortcomings of article positioning apparatus heretofore used for this purpose so that the inexpensive type coded labels can be used. Thus, the article positioning apparatus of this invention moves articles of any width almost instantaneously to one side of the conveyor without the undesired twisting of the articles described and without any stoppage of the articles.

The article positioning apparatus, preferably comprises a plurality of spaced, driven rollers mounted for simultaneous bodily movement laterally of the conveyor, each of which rollers desirably has a high-friction surface such as afforded by a polyurethane roller surface of the like. The drive shafts of the high-friction rollers are mounted on a common frame adapted simultaneously to move the high-friction rollers in a transverse direction while the rollers are being continuously rotated. A longitudinal side rail is provided against which the coded label containing side of the article is brought into engagement by the transverse movement of the spaced, driven high friction rollers. The side rail, in cooperation with the high-friction rollers, serves to maintain the side of the article at a parallel closely predetermined distance from the code readers.

Transverse movement of the rollers most advantageously is initiated by providing a light source on one side of the conveyor which source projects a beam of light adjacent to or across the rollers thereof to a light receiving device which, when the light beam from said source is interrupted by an article, generates a control signal for actuating transverse drive means connected to the common frame supporting the drive shafts of the high-friction rollers. This article positioning apparatus need only have a length slightly greater than the length of the longest article to be handled by the conveyor involved, unlike the slanted rail and roller article positioning means described which requires a length many times the length of the largest article to be handled thereby.

Many objects, features and advantages of this invention will become apparent from the description to follow taken in junction with the accompanying drawings wherein like reference numerals throughout the various views are intended to designate similar elements or components.

FIG. 1 is a top plan view of a portion of a conveyor system incorporating an embodiment of the article positioning apparatus of this invention showing a number of discharge stations located therealong;

FIG. 2 is an enlarged plan view of the article positioning apparatus of this invention shown in FIG. 1;

FIG. 3 is a view in perspective of an embodiment of an article of the type to be transported on the system of FIG. 1 showing a light-reflecting label on one side thereof;

FIG. 4 is a fragmentary sectional view of the embodiment of the positioning apparatus illustrated in FIG. 2, taken along section line 4—4 therein and showing the rollers thereof in an article receiving position; and FIG. 4A is a view corresponding to the view of FIG. 4 showing the rollers in a transversely shifted position whereby one selected side of the article being transported thereon is brought into engagement with a guide rail.

Referring, now, to FIGS. 1 and 2, there is illustrated a portion of a roller conveyor system 10 incorporating an embodiment of the article-positioning apparatus 12 of the present invention. The apparatus 12 may constitute an integral part of the system 10, or, as indicated, it may be a separate unit which can be incorporated into such a system. In the embodiment illustrated, the apparatus is connected at each end to roller conveyor sections 14 and 16. The sections 14 and 16 desirably are of conventional construction comprising longitudinally spaced metal rollers 14a and 16a, respectively, which are driven in the same direction to impart movement to an article 18 carried on the top of the rollers.

The conveyor system 10, as shown, may include a number of discharge stations 10d at which any given article 18 can be selectively discharged in any manner known to the art. The discharge stations may be the inlet sides of discharge chutes, belt conveyors, or, as illustrated, roller conveyors 20. In the conveyor system 10, selective discharge of an article 18 at a particular discharge station 10d is achieved by means of a sensing device such as a code reader 22 located along one side of the roller conveyor 16 section adjacent to each discharge station.

Each code reader 22 is programmed to respond only to a particular code group of markings 24 on a label 26 attached to one side 18a of each article 18 (see FIG. 3) identifying the associated discharge station. When the markings 24 on the label 26 correspond to the code to which a particular code reader 22 is to respond, a control signal will be generated to activate an article discharge means which may comprise an air or hydraulic cylinder 30 provided with a pushrod 32 having a pusher head 34 which acts to push the selected article 18 transversely of the roller conveyor 16 onto the associated secondary roller conveyor 20 at the selected discharge station 10d. When the code markings 24 on the label 26 comprises, for example, ordinary printed ink markings (as distinguished from special light reflective coatings), the side 18a of the articles 18 containing the labels should be parallel and very close to each code reader 22 as it passes the same. As best shown in FIGS. 2, 4 and 4A, such positioning of the label bearing side 18a of each article 18 with relation to each code reader 22 is attained in the present invention by the article-positioning apparatus 12.

In the embodiment illustrated, the article-positioning apparatus 12 comprises a plurality of spaced apart high-friction rollers 40, the extended drive shafts 42 of each of which are supported together on a common movable frame member 44. The high-friction rollers 40 are driven by a common drive chain 46 which engages a sprocket 48 positioned on each of the drive shafts 42. The drive chain 46 advantageously also drives the rollers 14a and 16a of the conveyor sections 14 and 16. Each drive shaft 42 has a relatively long key 42a slidably engaging the associated sprocket 48 which cannot move laterally on the drive shafts 42, so the rollers 40 are driven continuously throughout their transverse movement.

The drive shafts 42 of the high-friction rollers 40 pass through confronting pairs of channels 50—50' and 52—52' (FIGS. 4 and 4A) and ride in slide bearings 54 and 56 secured to side channels 50 and 52', respectively, located on opposite sides of the article-positioning apparatus 12. The inner wall of the channel 52 located on the same or right side of the conveyor system as viewed in the drawings where the code readers 22 are located has a plurality of openings 52a therethrough sufficient in diameter to receive the passage of the high-friction rollers 40 when they are shifted to the right from the position shown in FIG. 4 which is the initial position of the rollers to that shown in FIG. 4A.

The end of each drive shaft 42 where it joins the movable frame member 44 rides in a thrust bearing 58 mounted on the frame member. The frame member 44 is connected to a piston rod 60 (FIGS. 1 and 2) of a transverse positioning device such as an air cylinder 62.

Enclosure-forming members 64, 66 and 68 are provided to form housings for the extended drive shafts 42, the channels 50—50' and 52—52', the movable frame member 44 and other associated parts shown and described. The inner face 52b of the channel 52 and a lip or rail 40 formed on the inner end of the enclosure forming member 68 forms an abutment and guide means for the articles 18. After they are shifted in a transverse direction by the article-positioning apparatus 12 so that the label carrying side of the articles are brought near the code readers 22. The degree of transverse movement imparted to the rollers by the movement of the piston rod 60 is such that the smallest article to be handled located adjacent the left side of the conveyor system as viewed in the drawings will be pushed against the abutment and guide means 52b and 70. To prevent or minimize slippage between the articles 18 and the high-friction rollers 40 when the rollers are shifted to the far right have positions shown in FIG. 4a the surfaces of the rollers 40 most advantageously are covered with a non-skid, or high-friction material such as polyurethane.

In the embodiment of the conveyor system 10 illustrated, transverse shifting of an article 18 into engagement with the abutment and guide means 52b and 70 by the high-friction rollers 40 may be achieved by providing a light source 80 which directs a beam 82 of light across the high-friction rollers 40 toward a light receiver 84. The light receiver 84 is operatively connected to a conventional amplifier control circuit 86 which may include a control relay which controls a solenoid (not shown) in a valve unit 87 associated with the air cylinder 62. When the light beam 82 is interrupted by an article 18 moving onto the rollers 40, a relay or other control device operates the aforesaid solenoid and in the valve unit 87 to switch pressure from the front of the air cylinder 62 to the rear thereof causing the piston rod 60 to move the high-friction rollers 40 in unison in a transverse direction, thereby bringing the label-bearing side 18a of an article into engagement with the abutment means. In the simplest form of the invention where only one light source is used to sense the continued presence of an article on the article-positioning apparatus 12, the light beam 82 is oriented diagonally across the high-friction rollers 40 so the beam 82 will remain interrupted by an article 18 until the article leaves and is completely off the high-friction rollers 40, irrespective of the size of the article. When the article clears the light beam 82, the light receiver 84 again receives light which deenergizes the relay and the valve unit solenoid to return air pressure to the front of the air cylinder 62, whereupon the rollers 40 will return to their initial, article-receiving position. As indicated above, articles being transported to the apparatus 12 by the conventional roller conveyor section 14 should be spaced apart a somewhat greater distance than the length of the area occupied by the high-friction rollers 40 so that the beam 82 will be interrupted by only one article at a time.

The high-friction rollers 40 and the abutment means thus cooperate to position the label-bearing side 18a of all articles in flush, parallel to and against the rail 70 so the labels 24 will be parallel and close to the various code readers 22 adjacent each discharge station.

In the multiple discharge station conveyor system illustrated, normally there need be one article-positioning apparatus 12 in advance of one or more discharge stations alongside. However, if the conveyor system has any bends between any two discharge station the bends in the conveyor system can cause lateral shifting or twisting of the articles which makes it desirable to add another article position section before the articles are moved opposite another code reader.

It should be understood that various modifications and changes may be made in the preferred embodiment of the invention described above without departing from the broader aspects thereof. Thus, for example, have been shown and described for actuating transverse movement of the high-friction rollers, actuation thereof can be initiated for instance, by article-tripped switch means, or by mechanical activation of the air cylinder. Also, although the invention has its most important and advantageous application to roller conveyors, it also has an application to belt and slot conveyors and the like.

I claim:

1. In a conveyor system having driven conveyor means upon which articles are supported and conveyed longitudinally along a given path, article positioning apparatus adapted to form part of said path of said conveyor system, said article positioning apparatus comprising continuously driven article supporting and driving means for supporting and frictionally engaging the bottom of each article thereon and moving the same from an inlet to an outlet end thereof, article abutment means at one side of the article supporting and driving means which abutment means has article positioning points along a line parallel to the given path along which the article is being conveyed, said article supporting and driving means being mounted for bodily lateral movement toward and away from said article abutment means and normally having a first given initial position when initially receiving an article, and means for shifting said article supporting and driving means from said first given initial position toward said article abutment means to an extreme position to bring the side surface of an article being conveyed along said given path into sliding engagement with the article abutment means while the continuously driven article supporting and driving means feed the article longitudinally along said path, a conveyor section associated with said article positioning apparatus and onto which the positioned articles are discharged, said conveyor section having a number of discharge stations at which articles are to be selectively discharged depending on coded information placed on a given area of each article bearing a definite relationship to the side thereof nearest said abutment means, code reading means in front of each discharge station which is responsive to a code identifying the adjacent discharge station of a positioned article, which code is present on said given area of an article positioned against said abutment means, and means for discharging an article at a discharge station when the adjacent code reading means reads a code on an article indicating that the article is to be discharged thereat.

2. The article positioning apparatus of claim 1 wherein said article supporting and driving means comprises longitudinally spaced driven rollers with a high-friction material covering the same.

3. The article positioning apparatus of claim 1 wherein there is provided means for controlling said shifting means including article sensing means responsive to the passage of at least an appreciable length of the article onto said article positioning section for actuating said shifting means bodily to move said article supporting and driving means from said given initial position to a position where the article engages said article abutment means and responsive to the movement of a positioned article off of the article supporting and driving means for resetting the position of said shifting means to return said article supporting and driving means to said given initial position.

4. The article positioning apparatus of claim 1 wherein the conveyor system is to convey articles having varying dimensions in a direction lateral of the path of movement of the articles on said conveyor system, said shifting means of the article positioning apparatus effecting bodily movement of said article supporting and driving means thereof to an extent to move any article with the shortest dimension extending in said lateral direction and positioned anywhere along the width of the article positioning apparatus, the article supporting and driving means slipping beneath an article supported thereon when such article is pushed against said abutment means before reaching said extreme position.

5. The article positioning apparatus of claim 1 wherein the article supporting and driving means extends to said abutment means when in said initial position and is of a size to receive articles of varying size, and said abutment means has openings for receiving said article supporting and driving means when it is moved toward said abutment means into said extreme position where the same extends laterally beyond the abutment means.

6. The article positioning apparatus of claim 5 wherein said article supporting and driving means are longitudinally spaced driven rollers.

7. The article positioning apparatus of claim 1 wherein said adjacent conveyor section includes longitudinally spaced driven rollers having wear resistant surfaces with a coefficient of friction sufficient to drive the articles longitudinally of the conveyor section, said article supporting and driving means are longitudinally spaced driven rollers having different surfaces than said wear resistant surfaces of the rollers of said adjacent conveyor section which different surfaces have a coefficient of friction substantially greater than the same to prevent slippage between the article and the rollers when the rollers are moved by said shifting means laterally toward said abutment means.

8. The article positioning apparatus of claim 2 wherein each of said rollers is mounted on a drive shaft for rotation therewith, each of said drive shafts extending beyond both ends of its associated roller and transversely movable therewith, an elongated key means on each of said drive shafts extending from one end of its associated roller, and stationary drive means engaging said drive shaft in the region of said key means so that said drive shaft and said key means freely moves through said drive means, said drive means including means for slidably receiving said key means to continuously drive said rollers while in the transversely displaced positions thereof.

* * * * *